United States Patent [19]

Ciano

[11] E Re. 30,124

[45] Reissued Oct. 23, 1979

[54] TWEEZERS FOR USE WITH SEMI-CONDUCTOR WAFERS

[75] Inventor: John A. Ciano, Menlo Park, Calif.

[73] Assignee: Interconsal Associates, Inc., Palo Alto, Calif.

[21] Appl. No.: 875,582

[22] Filed: Feb. 6, 1978

Related U.S. Patent Documents

Reissue of:

[64] Patent No.: 3,981,527
Issued: Sep. 21, 1976
Appl. No.: 565,616
Filed: Apr. 7, 1975

[51] Int. Cl.[2] ..... B25B 9/02

[52] U.S. Cl. ..... 294/99 R; 81/43; 294/33

[58] Field of Search ..... 294/3, 7, 8.5, 11, 16, 294/28, 29, 31 R, 32, 33, 99 R; 24/255 R; 81/43; 128/321, 354; 269/6

[56] References Cited

U.S. PATENT DOCUMENTS

| | | | |
|---|---|---|---|
| 1,919,469 | 7/1933 | Keizer | 294/7 |
| 2,217,319 | 10/1940 | Poole et al. | 294/99 R |
| 2,304,966 | 12/1942 | Thrower | 294/33 X |
| 2,636,500 | 4/1953 | Schwartz | 81/43 X |
| 2,818,866 | 1/1958 | Thomas | 128/354 X |
| 3,496,807 | 2/1970 | Jones et al. | 81/43 |
| 3,665,790 | 5/1972 | Jones | 81/43 |
| 3,741,602 | 6/1973 | Ploeckelmann | 294/99 R |

*Primary Examiner*—Johnny D. Cherry
*Attorney, Agent, or Firm*—Lowhurst & Aine

[57] ABSTRACT

A tweezers for use in the movement of semiconductor wafers can be constructed utilizing upper and lower arms connected to one another in an established manner so that the free or holding ends on such arms may be moved towards one another. In a tweezers as disclosed the holding end of the lower arm includes a flat plate and a shoulder connected to the plate to the remainder of the lower arm and the holding end on the upper arm includes a plurality of separate resilient fingers extending from a support securing these fingers to the remainder of the upper arm. When the plate is inserted beneath an object such as a semiconductor wafer by appropriate manipulation of the arms the fingers can be brought against such an object so as to hold it against the plate. The resilient fingers are not apt to break such an object as it is held on the plate and will accommodate any variation in the height of such an object.

3 Claims, 2 Drawing Figures

TWEEZERS FOR USE WITH SEMI-CONDUCTOR WAFERS

Matter enclosed in heavy brackets [ ] appears in the original patent but forms no part of this reissue specification; matter printed in italics indicates the additions made by reissue.

REFERENCE TO RELATED PATENTS

Reference is made to the following U.S. patents as being of interest in connection with the subject matter of this disclosure:

Phoel U.S. Pat. No. 1,545,693
Schwartz U.S. Pat. No. 2,636,500
Jones, et al U.S. Pat. No. 3,496,807
Skipper U.S. Pat. No. 3,611,842
Ploeckelmann U.S. Pat. No. 3,741,602

BACKGROUND OF THE INVENTION

The invention set forth in this specification is directed towards tweezers which are primarily considered to be used in connection with the movement of comparatively small, comparatively thin semi-conductor wafers. It will be recognized, however, that the tweezers herein set forth can be utilized in connection with the movement of many other different objects.

Technically the word "tweezers" designates any small pincer like instrument for grasping or extracting. Conventionally such tweezers employ two different arms having ends such as may be referred to as mounting ends secured together in such a manner that these arms may be physically manipulated so as to bring other ends such as may be referred to as holding ends generally toward one another. Normally, a tweezers as indicated is constructed so that the two different holding ends may, if desired, be brought against one another. On occasion such tweezers are constructed so that the holding ends cannot be brought into contact with one another so as to minimize the possibility of such tweezers damaging a fragile object as they are used.

A great many specialized type of tweezers have been developed for various different purposes. It is known to form the holding ends on the arms employed in a tweezers so that such ends have specialized shapes enabling them to effectively hold specialized objects in a desired manner so that such objects may be transported and, if desired, worked on. At times tweezers type structures have been constructed so as to utilize elongated holding ends shaped as fingers which are intended to be used in clamping items such as an individual's hair between these arms. These and various other types of tweezers are not considered to be satisfactory for use in holding and moving semi-conductor and similar wafers.

The reasons for this pertain to the nature of such semi-conductor wafers. In general they are comparatively thin, brittle structures which can be easily broken by the application of a comparatively minimal force and which are apt to be damaged if they are not firmly held in place. Many of such wafers are currently handled or processed using tweezers after circuit components have been located upon them by various established or known techniques. On occasion such components on wafers can extend from the surfaces of such wafers to different amounts, resulting in such wafers being of uneven thickness.

A recognition of the need for tweezers which are especially constructed for use with semi-conductor and similar wafers has led to the development and patenting of specialized tweezers for such uses. The prior tweezers primarily intended for use with such wafers have been constructed so as to utilize a flat plate and either a plate or a rod-like clamping member to hold the wafer against such a plate. Such clamping members have been comparatively rigid structures. Because of this there is normally the possibility that such a clamping member will engage and damage a comparatively fragile, brittle article such as a semi-conductor wafer as the arms of the tweezers are manipulated to clamp the wafer against the plate.

SUMMARY OF THE INVENTION

A broad objective of the present invention is to provide new and improved tweezers. More specifically the invention is intended to provide tweezers which are especially desirable for use in handling and holding semi-conductor wafers but which can also be used with other objects. A further object of the invention is to provide tweezers for this purpose which are not apt to damage such wafers or other objects as such tweezers are used.

In accordance with this invention these objects of the invention are achieved in a tweezers having upper and lower elongated arms, each of these arms having a mounting end and a holding end, the mounting ends of the arms being located adjacent to one another and being secured to one another in such a manner as to permit the holding ends to be brought toward one another by the improvement which comprises: the holding end of the lower arm including a flat plate having a back edge and a shoulder connecting the back edge to the remainder of the lower arm, this plate being positioned beneath the lower arm on the side thereof remote from the upper arm, the holding end of the upper arm including a plurality of separate, resilient fingers and a support holding these fingers and connecting them with the remainder of the upper arm, the fingers curving outwardly and downwardly from the support generally toward the plate.

With the structure of this type the arms are capable of being moved toward one another so that the fingers are capable of independently and resiliently engaging an object on the plate generally between the edges of the plate so as to hold the object on the plate. Because such fingers separately engage such an object they do not tend to concentrate the forces exerted on the object to hold it in place and hence minimize the chances of breaking or otherwise damaging such an object. Further, such fingers accommodate any variation in the thickness of an object held against the plate such as, for example, a semi-conductor wafer holding various components upon one of its surfaces.

BRIEF DESCRIPTION OF THE DRAWING

Further details of the present invention will be apparent from a consideration of the remainder of this specification and the accompanying drawing in which.

Figure 1:
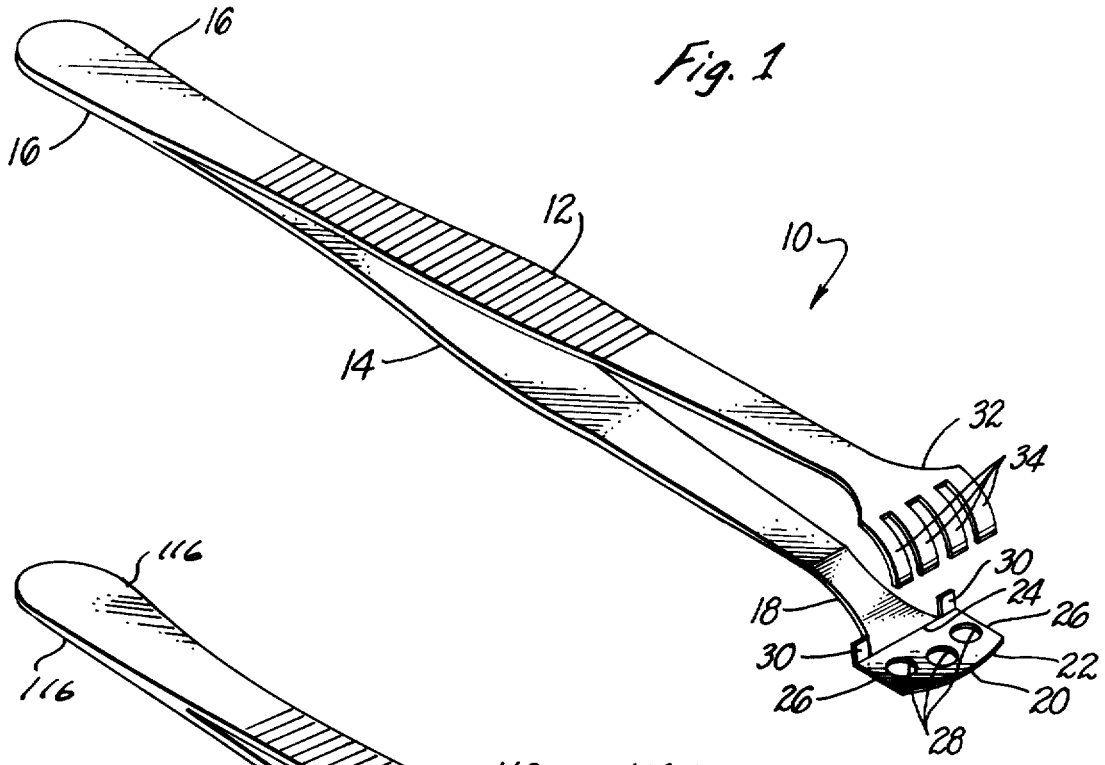
FIG. 1 is an isometric view of a presently preferred tweezers in accordance with this invention.

The illustrated tweezers embody the concepts or principles of the invention set forth and defined in the appended claims. From a consideration of the language of these claims it will be apparent that these concepts or principles may be easily embodied within various differently appearing and differently constructed tweezers through the use or exercise of routine engineering skill.

DETAILED DESCRIPTION

In the drawing there is shown a tweezers 10 in accordance with the invention which utilizes an upper elongated arm 12 and a lower elongated arm 14. These arms 12 and 14 have adjacent mounting ends 16 which are secured together in a conventional manner in such a way that normally the arms 12 and 14 diverge away from one another as they extend away from the ends 16. With this structure the arms 12 and 14 are sufficiently resilient so that they may be squeezed toward one another and so that they will resume their original positions when force is no longer applied to them.

With the tweezers 10 the arm 14 includes an offset shoulder 18 which carries a generally flat plate 20 having a front edge 22, a rear edge 24, and side edges 26. Preferably the edge 22 is shaped to a limited degree so as to facilitate insertion of the plate 20 under an object. Preferably this plate 20 is provided with as many holes 28 as this plate can accommodate without significantly reducing its structural strength. The shoulder 18 is used to connect the plate 20 to the arm 14 in such a manner that the plate 20 is generally beneath the arm 14 on the side of the arm 14 remote from the arm 12. Preferably this plate 20 is located at a slight angle to the arm 14 so that the tweezers 10 may be manually engaged as the plate 20 is located flush against a table surface or the like.

The shoulder 18 and the plate 20 constitute what may be referred to as a holding end on the arm 14. If desired this holding end may also include small tabs 30 located along the rear edge 24 at the junctures of this rear edge 24 with the sides 26. These tabs 30 extend generally upward from the plate 20 toward the arm 12. They serve to limit the amount the plate 20 may be shoved underneath the periphery of an object such as a semiconductor wafer. Other equivalent stop means can, of course, be employed.

The arm 12 carries a cross-support 32 which in turn carries a plurality of separate parallel fingers 34. These fingers 34 curve outwardly and downwardly from the support 32 and the arm 12 generally toward the plate 20. When the arms 12 and 14 are manipulated in a conventional manner these fingers 34 will move against any object on the plate 20 so as to tend to clamp such an object in place upon the plate 20.

Because the fingers 34 all operate independently from one another as springs they will tend to resiliently engage such an object in such a manner that there are only comparatively minor localized stresses and strains exerted upon such an object. Also these fingers 34 will accommodate variations in the thickness of any such object making it possible to hold an object having an irregular upper surface in the plate 20 without such an object being damaged.

Because the tabs 30 serve as stop means to limit the degree to which the plate 20 can be located under an object there is no danger of an object being held by the tweezers 10 in such a manner that it is positioned at an angle to the plate 20 as the result of engagement with the shoulder 18. This is considered to minimize the chances of breakage to a semi-conductor or similar wafer. If such an object should, as is common in the electronics industry, be engaged while it is damp with a processing solution no such solution will normally be trapped underneath such an object because the holes 28 will serve to permit such fluid to drain away from the object.

Small scraps or similar articles adhering to such an object will normally be abraded off of the object by either contact with the front end 22 or the holes 28. This minimizes the possibility of such a small particle supporting the object on the plate 20 as to produce localized stresses when the object is clamped in place. Further, the individual curved fingers 34 are of such a configuration as described so as to clear the shoulder 18 and the tabs 30 and so as to apply a minimal clamping force at a plurality of locations across the width of the plate 20.

Figure 2:
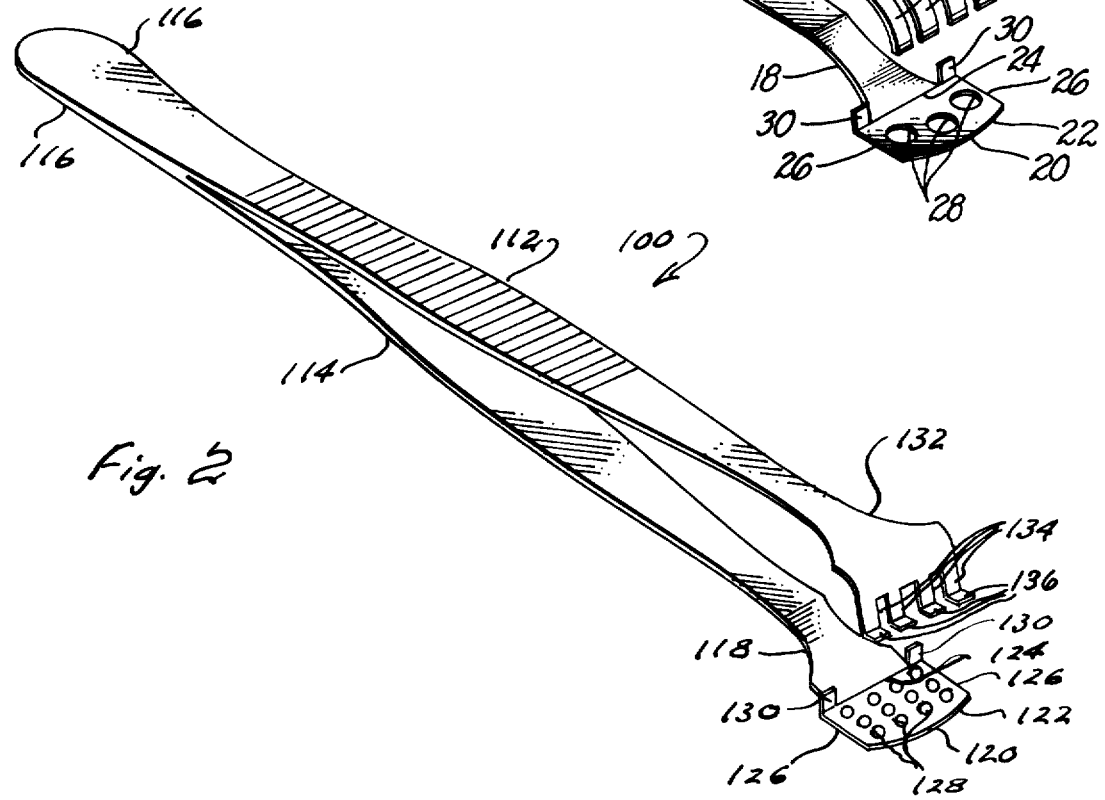
FIG. 2 is an isometric view of a modification of the tweezers shown in the preceding figure.

In FIG. 2 of the drawing there is shown a modified tweezers 100 which is very closely related to the previously described tweezers 10. In the interest of brevity various parts of the tweezers 100 which are the same or substantially the same as various parts of the tweezers 10 are not separately discussed herein and are indicated in the drawing and where necessary for explanatory purposes in the remainder of this specification by the numerals previously utilized to designate such parts preceded by the numeral "1".

There are minor differences between the tweezers 10 and 100 pertaining to shape, size, spacing and the like. The principal difference between these two tweezers 10 and 100 is, however, that the tweezers 100 are constructed so that the fingers 134 are provided with generally flat terminal ends 136 located remote from the cross support 132. These ends 136 are on occasion advisable in minimizing the stress concentrations on a brittle wafer such as a wafer of a semiconductive material, being held through the use of the tweezers 100. It is to be emphasized, however, that fingers formed as the fingers 34 are suitable for a large number of applications, particularly when such tweezers have flat, linear type ends as shown. The ends 136 are preferably oriented with respect to the remainder of the fingers 134 so that they will be parallel to the plate 120 when a wafer is held with the tweezers 100. This will, of course, distribute the force applied to such a wafer by a finger 134 over a comparatively large area which is larger than the area engaged by a finger 34 with the tweezers 10.

I claim:

1. A tweezers *for handling a rigid, thin fragile object, said tweezers* having upper and lower elongated arms, each of said arms having a mounting end and a holding end, said mounting ends of said arms being located adjacent to one another and being secured to one another in such a manner as to permit said holding ends to be brought toward one another in which the improvement comprises:

said holding end of said lower arm includes a flat plate having a front edge, a back edge and side edges connecting said front and back edges and also includes a shoulder connecting said back edge with the remainder of said lower arm, said plate being positioned beneath said lower arm on the side thereof remote from said upper arm by said shoulder, said holding end of said lower arm also including stop means for limiting the extent to which said plate can be inserted under an object, said stop means being located generally along said back edge of said plate and extending from said back edge generally toward said holding end of said upper arm, said stop means comprising two tabs extending from said back edge, each of said tabs being located adjacent to a side edge of said plate, [said plate being provided with a plurality of perforations extending through said plate, said perforations allowing liquid to drain through said plate], said holding end of said upper arm includes a plurality of separate, resilient fingers spaced from one another and a support holding said fingers and connecting said fingers to the remainder of said upper arm, said fingers curving outwardly and downwardly from said support generally toward *and substantially coextensive with* said plate, *said fingers having substantially flat terminal ends for broad distribution of forces on a surface of said object,* said arms being capable of being moved toward one another so that said fingers are capable of independently and resiliently engaging [an] *said* object on said plate generally between said front and rear edges of said plate so as to hold said object on said plate.

2. A tweezers as claimed in claim 1 [wherein:] [each of said fingers includes a terminal end], said terminal ends being located with respect to the remainders of said fingers so as to be parallel to said plate when said arms are moved toward one another so as to hold an object during the use of said tweezers.

*3. A tweezer as claimed in claim 1 wherein said flat plate is provided with a plurality of perforations extending through said plate, said perforations allowing liquid to drain through said plate.*

* * * * *